United States Patent [19]

Herren

[11] Patent Number: 4,718,544

[45] Date of Patent: Jan. 12, 1988

[54] FLEXIBLE LAGGING STRIPS FOR DRUM PULLEYS

[76] Inventor: Harold L. Herren, 802 Main St., Platteville, Colo. 80651

[21] Appl. No.: 857,933

[22] Filed: Apr. 30, 1986

Related U.S. Application Data

[63] Continuation-in-part of Ser. No. 06/730,363, May 3, 1985, abandoned.

[51] Int. Cl.⁴ ............................................. B65G 23/06
[52] U.S. Cl. .................................... 198/843; 474/191
[58] Field of Search ............... 198/843, 835, 834, 842; 474/185, 191, 92, 188

[56] References Cited

U.S. PATENT DOCUMENTS

| | | | |
|---|---|---|---|
| 1,434,239 | 10/1922 | Williams | 474/185 |
| 3,354,735 | 11/1967 | Holz | 474/191 |
| 3,789,682 | 2/1974 | Holz | 474/185 |
| 4,480,670 | 11/1984 | Payne | 198/843 X |
| 4,589,543 | 5/1986 | Hastem-Müller | 198/843 X |

*Primary Examiner*—Randolph A. Reese
*Assistant Examiner*—Peter M. Cuomo
*Attorney, Agent, or Firm*—Dean P. Edmundson

[57] ABSTRACT

A replaceable lagging structure, for a conveyor pulley, and specifically to a flexible lagging structure useable and adaptable on different size pulley drums. The structure preferably has a pair of parallel, elongated, arc shaped metal plates which are connected together by a flexible traction rubber pad. The outer elongated arc plate edges are adapted to be spot-welded to the periphery of a pulley drum surface. The arc shape of each metal section is such that the lagging structure is adapted to fit different sized drum pulleys. The thickness of the metal sections does not restrict or hinder the required flexibility of the lagging structure.

13 Claims, 6 Drawing Figures

FLEXIBLE LAGGING STRIPS FOR DRUM PULLEYS

CROSS-REFERENCE TO RELATED APPLICATION

This is a continuation-in-part of my copending application Ser. No. 06/730,363, filed May 3, 1985, now abandoned.

BACKGROUND OF THE INVENTION

This invention relates to heavy industry conveyor belt pulleys, and more particularly to drum pulleys and the surface lagging for such pulleys. Drum pulleys have a smooth face surface and it is therefore necessary to provide a lagging cover for that surface. When the lagging becomes worn it must be replaced. Various forms of a lagging surface have been used heretofore, and, as far as known, they have all required too many parts and are impractical and expensive in their installation and capability of replacement. Further, it has not been possible heretofore to have just one size lagging surface which is adaptable for use with any different surface size drum pulley in that industry.

This invention provides a novel flexible structural lagging surface which is adaptable in one size for use with different sized drum pulleys.

This invention provides a one size flexible lagging structure adapted for use on different sized pulleys. The securement of the structure of the drum, being accomplished by only a few tack-weld spots, on the outer edges only, of each of the outermost metal sections, adapts this lagging structure for easy removal from the drum, by easy torch-burnable or carbon-arc-blowing release of each of the tack welded spots, and a removal of the lagging structure from the drum pulley.

Included in the basis for this application is the advantage of the flexible traction pad rubber connection of the parallel base-plates, with the traction pad extending on and over the plates, by the method of thus joining the plates in spaced relationship and allowing a small groove or gap to extend between the edges of the adjoining metal plate sections. As a result, the traction pad rubber is able to flex in the area between spaced-apart metal plate sections so that the lagging structure combination will conform to the surface of the drum to which it is attached. Thus, the one size structure, so formed as explained, is adaptable for use on different sized pulley drums.

Various types of pulley coverings and lagging structures are described in the following: U.S. Pat. Nos. 1,636,492 (Taylor); 2,707,403 (Thompson); 3,354,735 (Holz); 3,789,682 (Holz); 4,290,761 (Suginaka); 1,434,239 (Williams); and International Publication No. WO 82/00326 (Holz).

However, none of such prior devices are adapted to fit all different sized pulleys and do not exhibit the advantages provided by the lagging structure of this invention.

SUMMARY OF THE INVENTION

This invention, in a preferred embodiment, provides a flexible, replaceable lagging structure combination for attachment to the peripheral surface of a conveyor belt drum pulley. The combination comprises a pair of spaced-apart metal sections which are secured to the underside of a length of flexible rubber traction material. Each metal section is preferably arc-shaped. One edge of each of the outermost metal sections is adapted to be spot welded to the peripheral surface of the pulley.

The rubber traction material to which the metal sections are bonded supports the metal plates in side-by-side, spaced apart arrangement. The rubber traction material of the lagging structure provides traction for a belt passing around the pulley.

One object of this invention is to provide an elongated flexible lagging structure comprising a plurality of metal sections. Each of the metal sections is preferably sectionally formed in an arc. A flexible rubber traction pad connection member extends over each of said backing plates and secures them flexibly together, so as to hold the plates in parallel arrangement with each other and with a space or groove between them.

Another object is the provision of such a flexible lagging structure having such metal sections so formed, and with them each being adaptable for tack-welding or spot welding securement of the outermost elongated edges of the metal sections to the face of a drum, without reference to the diameter of the drum to which the lagging structure is attached.

BRIEF DESCRIPTION OF THE DRAWINGS

The invention is described in more detail hereinafter with reference to the accompanying drawings wherein like reference characters refer to the same parts through the several views and in which.

DETAILED DESCRIPTION OF THE INVENTION

In FIGS. 1-4 there is illustrated a preferred embodiment of flexible lagging structure 10 of the invention comprising two metal sections 12 and 14 secured to the underside of rubber traction material 11. Each metal section is arc-shaped in cross-section, as illustrated. The metal sections are generally in the same plane and are spaced-apart.

Each metal section has a thickness in the range of about 0.07 to 0.5 inch. That is, the metal sections are at least 14 gauge or heavier. Preferably they are made of steel. Metal having the thickness described is sufficiently rigid that it cannot be bent or flexed manually.

The only flexing of the lagging structure of the invention is via the rubber traction material 11 in the area of the gap 13 between the adjacent edges of the metal sections 12 and 14. Preferably the gap or space between the metal sections is about 0.1 to 0.5 inch.

Figure 1:
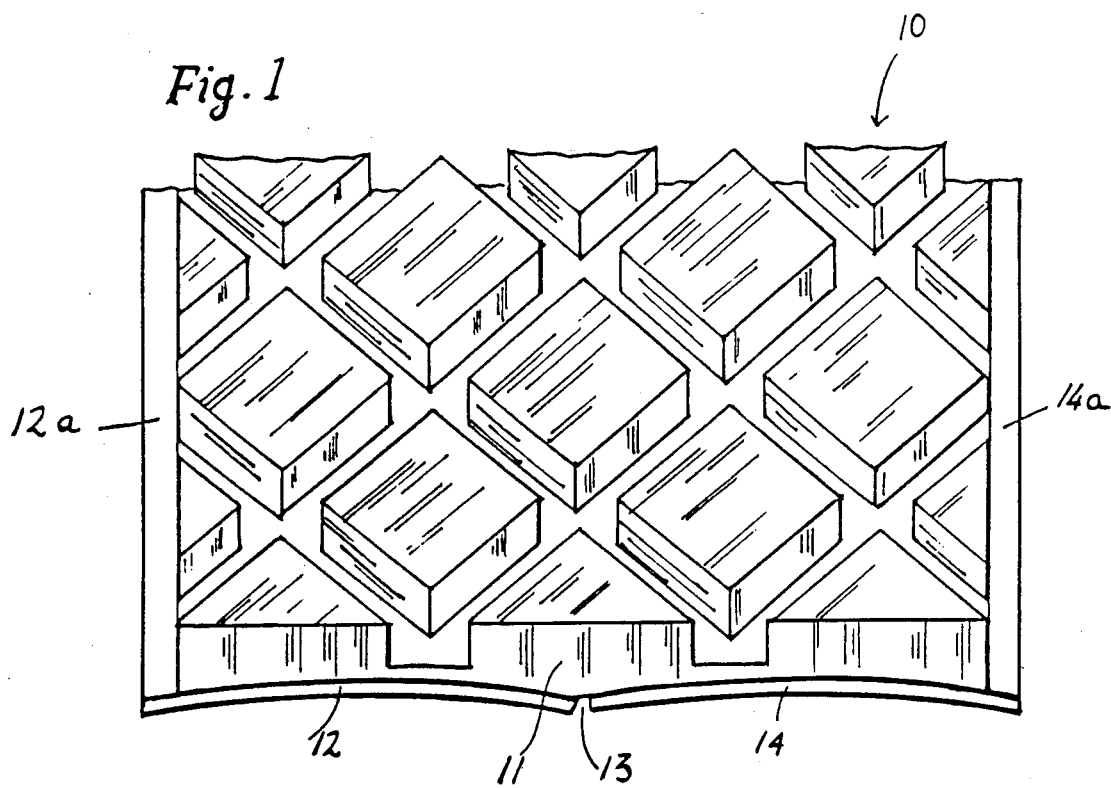
FIG. 1 is a perspective view of my novel flexible lagging structure.
Figure 2:
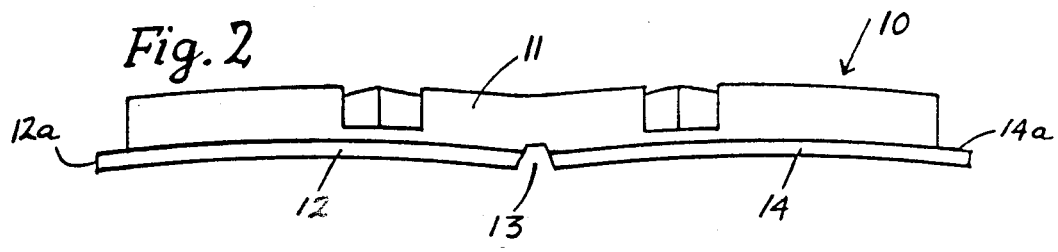
FIG. 2 is an end view thereof.

The thickness of the rubber traction material is at least about 0.2 inch, and preferably is 0.3 to 0.5 inch. Of course, the rubber material can be much thicker if desired. If desired the rubber traction material may be slightly indented in the area of the gap 13 (as illustrated in FIG. 2) so as to facilitate additional flexibility of the rubber traction material at that point. The indentation may be about 0.05 to 0.1 inch deep, for example. This feature may be desirable when the rubber traction material is especially thick.

Preferably the arc shape of the metal sections is such that each section has a radius of curvature in the range of about 5 to 6 inches when the metal section is 2 to 3 inches wide. When each metal section is about 0.5 inch wide it is not necessary to have an arc shape. For wider sections there is preferably a slight arc shape, although if the lagging structure is to be secured to a large diameter pulley the arc shape may not be required until the metal sections have a width of more than about one inch.

The width of each metal section is in the range of about 0.5 to 4 inches (preferably about 2 to 3 inches). When the lagging structure has two metal sections of the preferred width, the overall width of the structure combination is about 5.5 inches.

Preferably the length of the lagging structure is in the range of about 3 to 6 feet. Thus, the lagging structure is adapted to extend transversely across the surface of a drum pulley, as illustrated in the drawings. If the pulley has a length less than the length of the lagging structure, then the excess length of the lagging structure may be simply cut-off.

The width of the lagging structure of this invention may also vary. For example, it may be as narrow as about 4 inches or as wide as about 16 inches, if desired. The number and width of the metal sections in each lagging structure may also vary.

The rubber traction material includes a tread pattern. That is, the outer or top surface of the traction material includes raised areas which are separated by grooves to prevent build up of sand, rock or water on the pulley surface.

Figure 3:
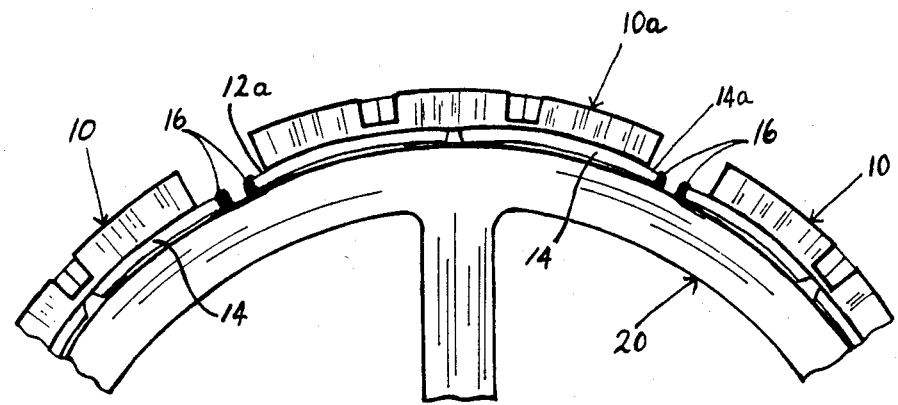
FIGS. 3 and 4 are edge views of a drum pulley to which the flexible lagging combination of this invention has been secured wherein the pulley shown in FIG. 3 has a smaller diameter than the pully shown in FIG. 4.
Figure 4:
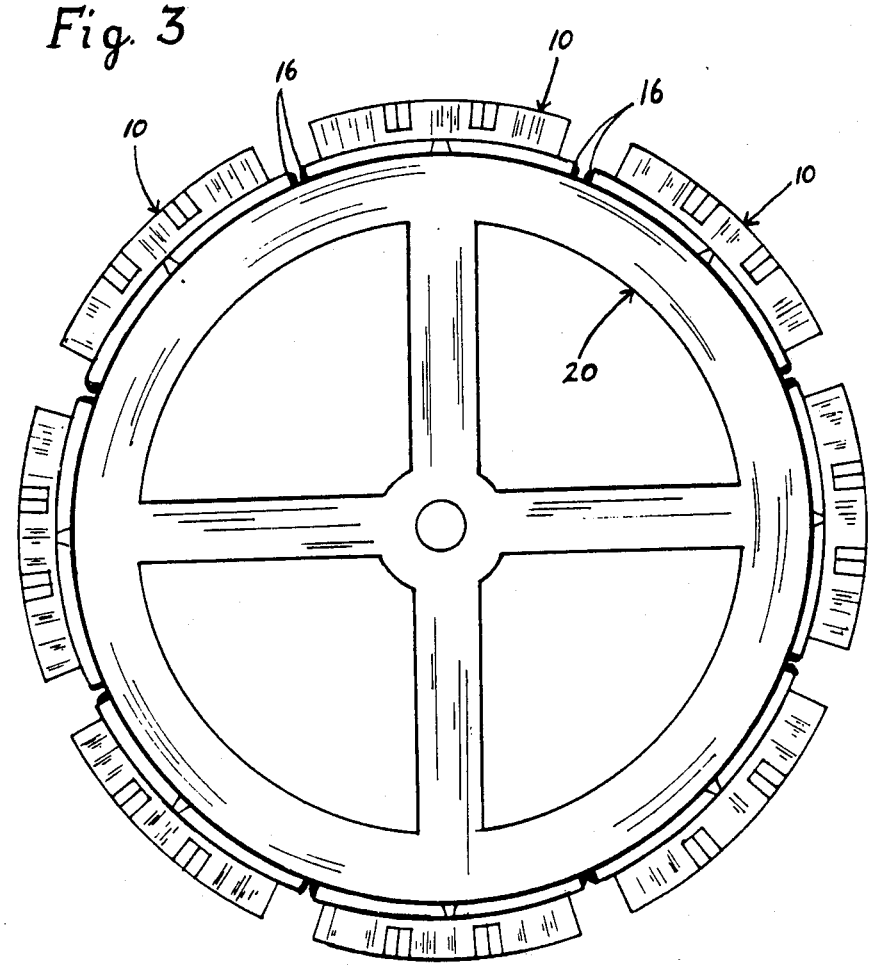

The edges 12a and 14a, respectively, of metal sections 12 and 14 are exposed, as illustrated, so that such edges may be spot- or tack-welded to the peripheral surface of a drum pulley 20 (as shown in FIGS. 3 and 4). Spot welds 16 are illustrated in the drawings.

The metal sections are bonded securely to the underside of the rubber material 11. Preferably this is accomplished by placing the metal sections into a mold, after which the unvulcanized rubber is added and then cured. As a result, the metal sections become securely bonded to the underside of the rubber.

Because of the arc cross-sectional shape of the metal sections, and because of the space or gap between the metal sections, the lagging structure of this invention is adapted to closely conform to drum pulleys of a wide variety of diameters. As a result, it is not necessary to make or provide different types of lagging structures for different size drum pulleys.

Lagging structures of this invention as described herein are adapted to be used on drum pulleys having diameters as small as 10 inches or as large as 48 inches or even larger (e.g., 60 inches).

Figure 5:
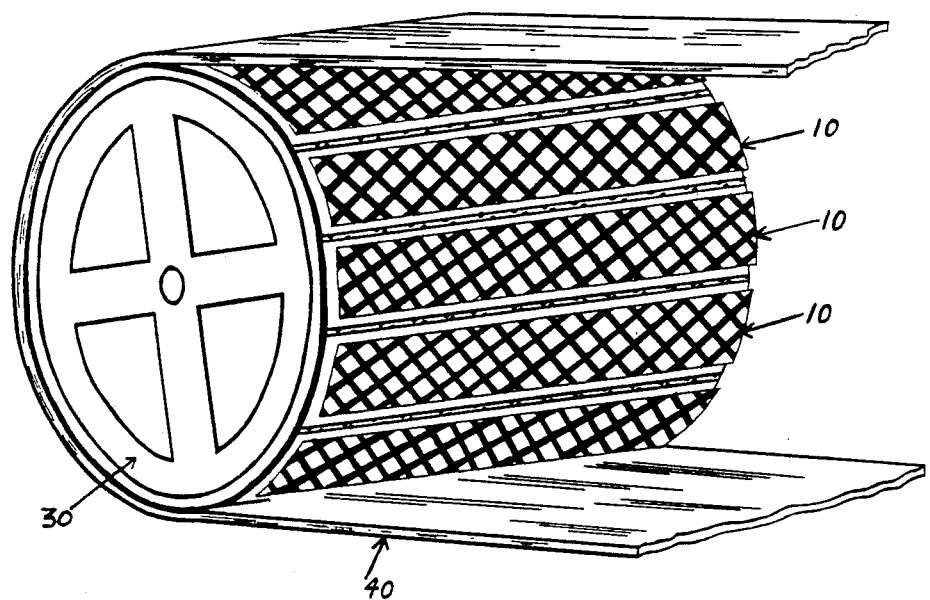
FIG. 5 is a perspective view of a drum pulley having this flexible lagging structure secured thereto, with a conveyor belt passing around the pulley.

FIG. 5 illustrates a flat surface drum pulley wheel 30 over which a conveyor belt 40 runs in a conveyor operation to carry heavy material. To the surface of that pulley 30 several of the lagging structures 10 of this invention are secured by spaced spot-tack-weldment, at the outermost parallel edges only of the metal sections.

FIG. 5 is illustrative of the securement of several of such lagging structures 10 to a drum pulley.

When the lagging structure is affixed to the peripheral surface of the drum only, the outer edges of each plate are tack-welded at spots 16. The inner adjacent edges of the metal sections are not welded but are free from drum connection. Thus lagging structures of the invention are adaptable for securement to the conventional drum pulleys in the heavy conveyancing industry, for example.

On such conveyor belt pulleys it is possible, by the use of this one lagging structure, to cover the peripheral surface of the full range of pulley sizes, without having to have different sized structures for different sized pulleys. No fastening pieces, channel-strips, bolts, screws, or other parts are needed in order to utilize the universal lagging structure of this invention.

In the use of this flexible lagging structure on a pulley, when the traction pad 11 becomes worn and in need of replacement, then the tack-weldment spots 16 securing the plate to the pulley can be easily conventionally torch-burned or carbon-arc-blown for thereby loosening the worn lagging structure and removing it from the pulley. Then a new lagging structure can be replaced in its stead, without having to dismantle the pulley and conveyor belt. Each individual lagging structure can be so installed or removed one at a time, without having to dismantle the pulley and conveyor belt.

No fastening pieces, bolts, screws, telescoping, channels, clamps or overlapping connection parts are necessary in the use of the structure of this invention. All that is required to fasten to a pulley is to tack or spot weld it at a few edge places to the peripheral surface of the pulley.

Figure 6:
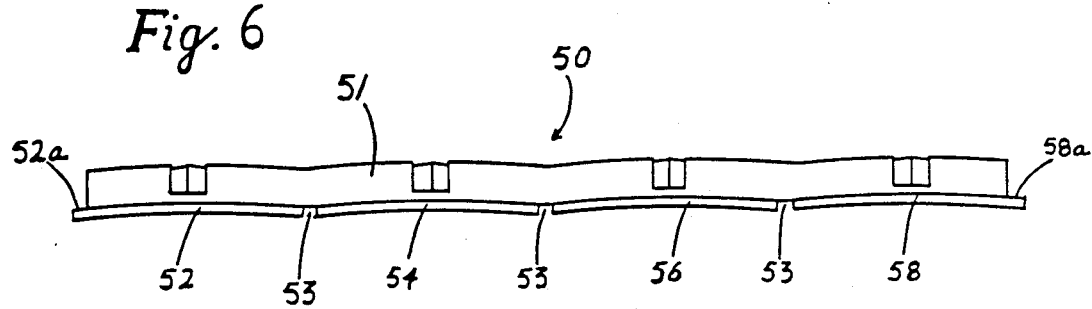
FIG. 6 is an end view of another embodiment of flexible lagging structure of the invention.

Utilizing the principles of this invention it is also possible to use more than two metal sections in each lagging structure. For example, there may be three, four, five or more side-by-side metal sections in each lagging structure, each of which is secured to the underside of the rubber traction material. This is illustrated, for example, in FIG. 6 where there is shown an end view of flexible lagging structure 50 comprising a single flexible rubber traction material 51 having secured to the underside thereof individual metal sections 52, 54, 56 and 58. The metal sections are separated by gaps 53. Each metal section is arc-shaped in cross-section as described above in connection with FIGS. 1–4. Because the lagging structure may flex in the areas of the gaps between adjacent metal sections, the lagging will adapt to any desired pulley size. The outermost edges 52a and 58a are exposed and accessible for spot weld attachment to the desired pulley.

Since many changes and modifications may be made within the spirit, teaching and scope of this invention, in the preferred embodiments thereof hereinbefore explained, it is to be understood that this invention shall be limited only by and within the scope of the hereunto appended claims.

What is claimed is:

1. A flexible, replaceable lagging structure conbination for attachment to the peripheral surface of a conveyor belt drum pulley, said combination comprising a single length of flexible rubber traction material and at least two spaced-apart arcuate metal sections; wherein each said metal section is secured to the underside of said length of flexible rubber traction material; wherein one edge of each of the outermost metal sections is exposed for welding to said surface of said pulley, and said rubber traction material is disposed above said metal sections and provides a traction surface for said pulley.

2. A combination in accordance with claim 1, wherein said metal sections are parallel, and wherein adjacent edges of said metal sections are separated by a distance in the range of about 0.2 to 0.5 inch.

3. A combination in accordance with claim 1, wherein each said metal section has a width in the range of about 2 to 3 inches.

4. A combination in accordance with claim 1, wherein said rubber material is vulcanized in the presence of said metal sections to thereby bond said metal sections to said rubber material.

5. A combination in accordance with claim 1, wherein each said metal section has an arc shape with a radius in the range of about 5 to 6 inches.

6. A combination in accordance with claim 1, wherein said lagging structure has a width in the range of about 4 to 16 inches.

7. A flexible, replaceable lagging structure combination for attachment to the peripheral surface of a conveyor belt drum pulley, said conbination comprising a single length of flexible rubber traction material and two spaced-apart arcuate metal sections having a thickness in the range of about 0.07 to 0.5 inch; wherein each said metal section is secured to the underside of said length of flexible rubber traction material; wherein adjacent edges of said metal sections are parallel to each other and are separated by a distance in the range of about 0.1 to 0.5 inch; wherein one edge of each said metal section is exposed for welding to said surface of said pulley, and said rubber traction material is disposed above said metal sections and provides a traction surface for said pulley.

8. A combination in accordance with claim 7, wherein each said metal section has a width in the range of about 2 to 3 inches.

9. A combination in accordance with claim 7, wherein each said metal section has an arc shape with a radius in the range of about 5 to 6 inches.

10. A combination in accordance with claim 7, wherein said lagging structure combination has a length in the range of about 3 to 6 feet and a width of approximately 5 to 6 inches.

11. A combination in accordance with claim 7, wherein said rubber traction material has a thickness of about 0.3 to 0.5 inch.

12. A combination in accordance with claim 7, wherein said rubber material is vulcanized in the presence of said metal sections to thereby bond said metal sections to said rubber material.

13. A flexible, replaceable lagging structure combination for attachment to the peripheral surface of a conveyor belt drum pulley, said combination comprising a single length of flexible rubber traction material and two spaced-apart metal sections; wherein each said metal section is arc shaped and is secured to the underside of said length of flexible rubber traction material; wherein adjacent edges of said metal sections are parallel to each other and are separated by a distance in the range of about 0.3 to 0.5 inches; wherein said lagging structure combination has a length of about 3 to 6 feet; and wherein one edge of each said metal section is exposed for welding to said surface of said pulley, and said rubber traction material is disposed above said metal sections and provides a traction surface for said pulley.

* * * * *